April 23, 1935.   A. E. FORSYTH   1,998,926
VEHICLE SUSPENSION APPARATUS
Filed April 17, 1934   2 Sheets-Sheet 1

Inventor
Albert E. Forsyth
By Bates, Gofrick, & Teare
Attorneys

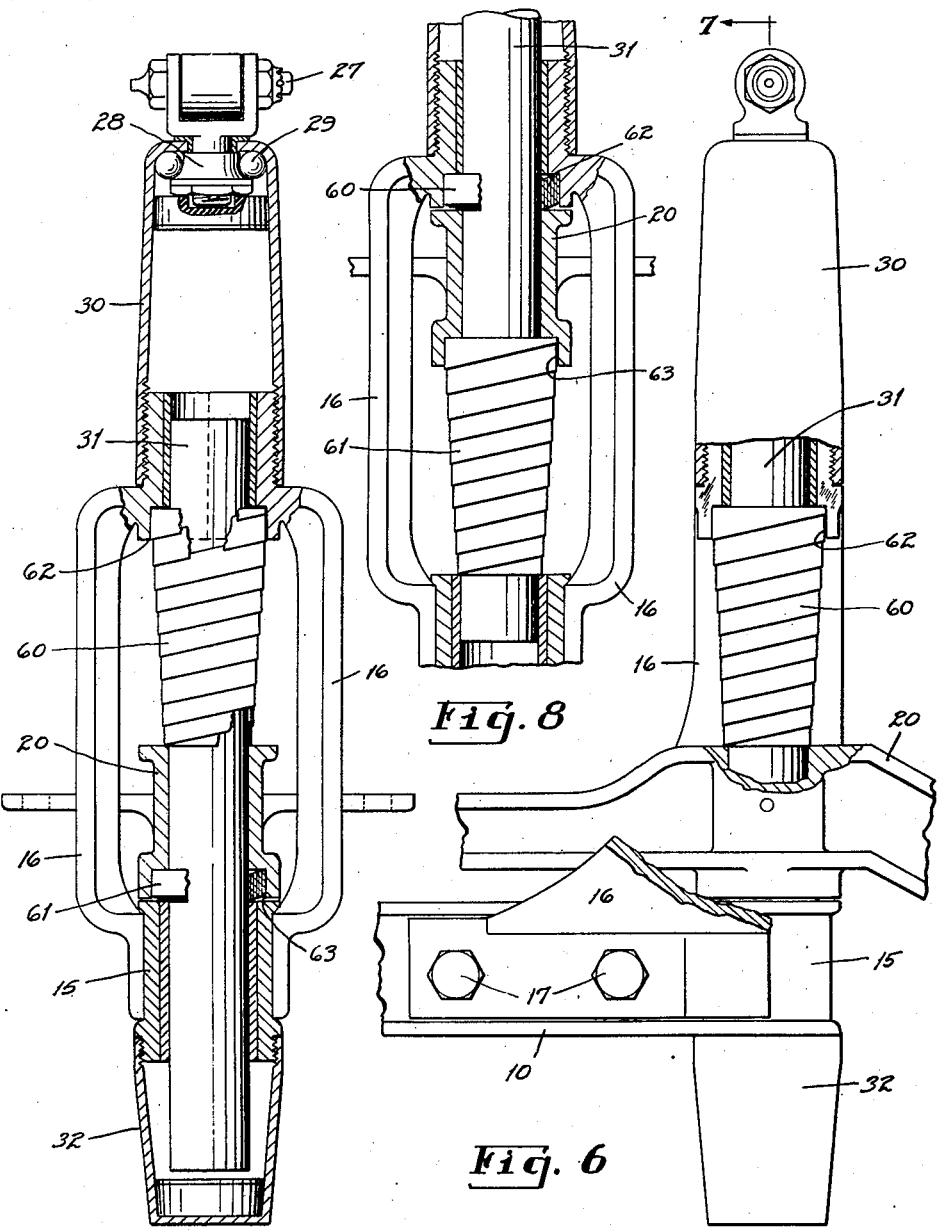

Patented Apr. 23, 1935

1,998,926

UNITED STATES PATENT OFFICE 1,998,926

VEHICLE SUSPENSION APPARATUS

Albert E. Forsyth, Ottawa, Ontario, Canada, assignor to Forsyth Automotive Pneumatic Spring Limited, Ottawa, Ontario, Canada, a corporation of Canada Application April 17, 1934, Serial No. 720,990

6 Claims. (Cl. 267—15).

This invention relates to means for yieldably suspending the front wheels of a motor vehicle. The present trend of "knee action" wheels and the efforts to accomplish such construction have resulted in an arrangement whereby the wheels having a slight lateral movement with reference to the axle, and as a result, the tires are worn before they have been used approximately one-third of their expected life.

Some of the devices, which have been used for such purpose have included helical springs that have been disposed between the axle and the wheel bracket, but experience has demonstrated the fact that these are objectionable, because the natural period of vibration of a coiled spring is unsuited for wheel suspension purposes. Consequently, it has been necessary to utilize a shock absorber or a snubber, so as to resist yieldingly the recoil movement of the spring. The addition of such accessories however, in a relatively restricted space is objectionable, for shock absorbers weaken very quickly and require adjustment at frequent intervals, and unless this service is performed, the springs return to their natural period of vibration and destroy the desired riding qualities of the car.

An object of my invention therefore, is to provide a front wheel suspension in which the wheels rise and fall in a true predetermined plane while at the same time, they are free to be turned for steering purposes.

A further object of my invention is to provide a front wheel suspension, which eliminates the necessity for metallic springs, as well as a shock absorber that is customarily used with metallic springs.

A further consideration in connection with front wheel suspension is the fact that the usual arrangement has the front springs in vertical line with the chassis frame. Accordingly, inasmuch as the frame is bowed inwardly at the front end, the distance between the points of suspension is smaller than it is at the rear end, with a result that there is considerable more tendency for the car to roll at the front end than at the rear end.

A further object of my invention therefore, is to increase the width of the points of suspension at the front of the car until it is at least equal to or greater than the distance at the rear and thus, I reduce the body roll to a minimum, and thereby increase the riding qualities and safety of the vehicle.

Figure 1:
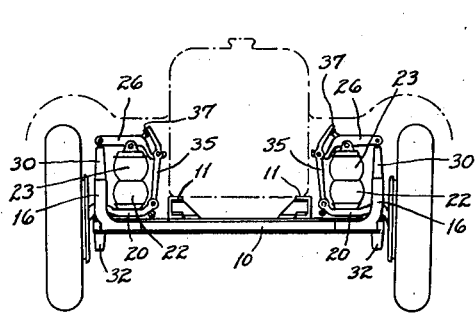
Figure 2:
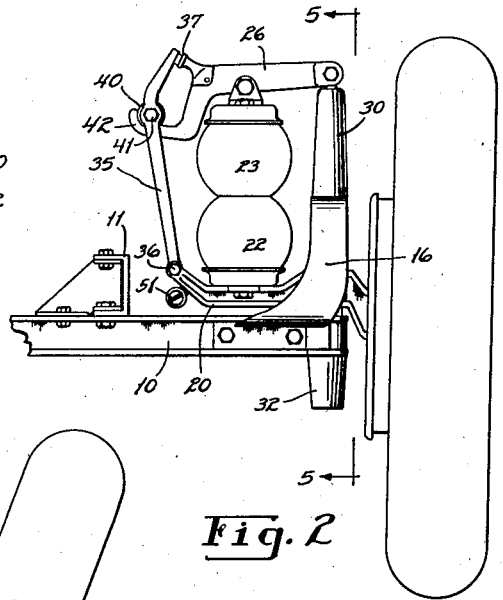
Figure 3:
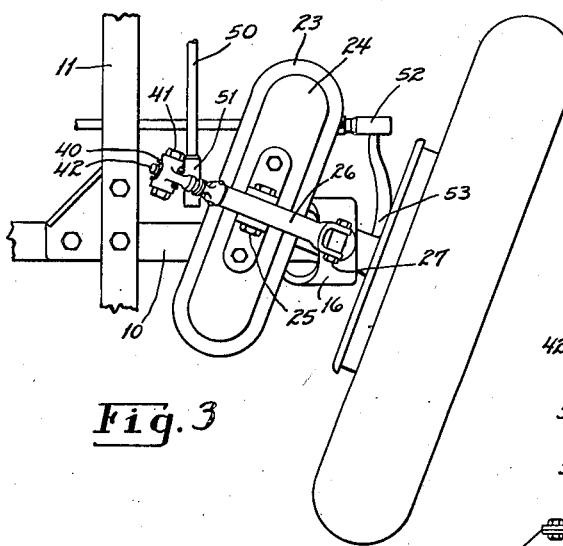
Figure 4:
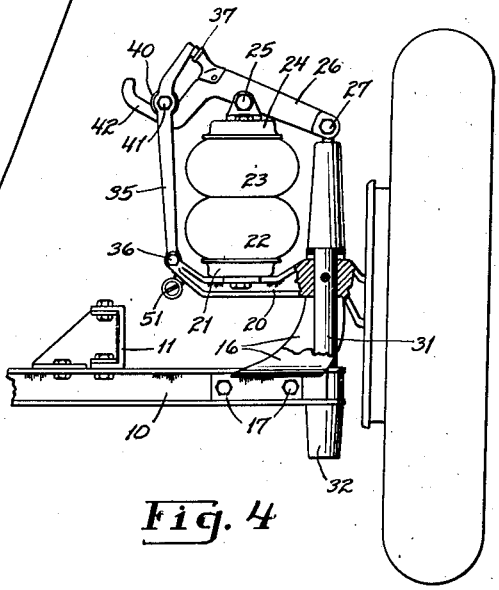
Figure 5:
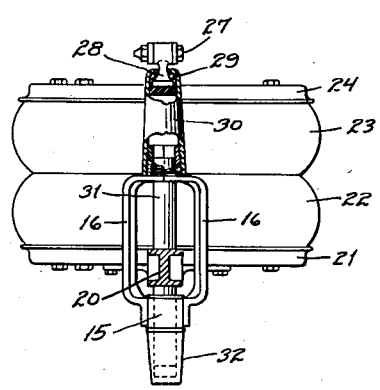

Referring now to the drawings, Fig. 1 is a front view of the front wheel suspension for motor vehicles embodying my invention; Fig. 2 is an enlarged view similar to that shown in Fig. 1; Fig. 3 is a top plan view of the suspension and illustrates the wheel turned with reference to the axle; Fig. 4 is a front elevation showing a wheel in a different position with reference to the frame; Fig. 5 is a section taken on the line 5—5 in Fig. 2; Fig. 6 is a front elevation partly in section through a device embodying my invention and illustrating a telescopic dust shield adjacent the king pin; Fig. 7 is a section taken on the line 7—7 in Fig. 6, and Fig. 8 is a sectional view showing the dust shield between the bottom of the cross frame member and the king pin guide.

My invention is especially well adapted for front wheel suspension, and so I have shown a vehicle, as having a front cross frame member 10, which may be directly attached to longitudinal frame members 11. The cross frame member terminates in eyes 15 and has attached to it, two members 16 which are bolted to the cross frame member, as at 17, and which coact when brought together to provide a guideway for the wheel support. The wheel support in turn is illustrated, as an arm 20, which extends inwardly over the top cross frame member, and which carries a seat 21 on which a pneumatic element 22 is supported. A similar pneumatic element 23 is superimposed upon the element 22 and in turn, is positioned within a seat 24 that is pivotally mounted at 25 upon an arm 26. The last named arm is pivotally connected as at 27 to a swivel coupling 28 that includes a ball bearing 29.

The coupling, in Fig. 5, for example, is shown as being positioned at the top of an extension 30 that is removably secured by a threaded connection to the top of the yoke 16. The arm 20, in turn, is rigidly fastened to a king pin 31 that projects upwardly and downwardly from the arm and is disposed between the pneumatic elements and the wheel, and the king pin is slidably mounted within the extension 30 and through the eye 15 at the end of the cross frame member 10. A cup-shaped closure 32 may be removably connected, as by a threaded connection, to the cross-frame member, and may provide a lubricant receptacle into which the king pin projects.

To connect the inner end of the arm 26 to the arm 20, I have shown a link 35, the lower end of which is pivotally connected as at 36 to the arm 20 and the upper end of which bears against a projection 37 on the arm 26. In the preferred arrangement the connection at 37 comprises a rubber button that extends laterally from the link 35 at the upper end of it, and that engages a socket in the extension.

To provide a yielding resistance to the recoil action of the pneumatic elements, I have illustrated a roller 40 that is journalled at 41 in the arm 35 and that is arranged to roll along a trackway 42 that extends upwardly from the inner end of the arm 26.

The trackway, as shown in Figs. 2 and 4, is inclined upwardly, and from an inspection of the drawings, it will be observed that whenever the elements are compressed a maximum amount, the roller moves from the position shown in Fig. 2 to that shown in Fig. 4. During such movement, it travels in a downward direction. On the recoil movement, the roller is forced to travel up a plane, and thereby yieldingly to resist the recoil action. Thus, the mechanism acts, as a shock absorber or snubber to the recoil movement of the yielding suspension.

In Fig. 3, I have shown the wheel, as being turned at an angle with reference to the cross frame member 10. Such turning is accomplished by a pivotal action around the axis of the king pin 31, and during such movement, the pneumatic elements are turned, as a unit with the wheel. Accordingly, I have shown a steering rod 50, as being conveniently attached at 51 to the bracket arm 20, and I have shown the tie rod 52 between the steering heads, as being conveniently attached at 53 to the arm 20 adjacent the brake drum. The relationship of the interfitting king pin and guide members is such that the lower end of the pin is still within the eye fitting when the pneumatic elements are compressed to the extreme limit of the movement, while the upper end of the king pin is within the yoke bearing, when the pneumatic elements are extended to the limit of movement. Thus the king pin is at all times guided for movement in a rectilinear direction, and inasmuch as the guide members are rigid with the cross-frame member, there is no possibility of lateral movement of the wheels with reference to the cross frame member. In other words, the tires are at no time subjected to an in and out motion that causes rapid deterioration.

The chambers formed within the housings 30 and 32 respectively may be supplied with lubricant which maintain the desired lubrication, and protection from the elements. To increase the degree of protection, I have shown a spiral telescopic sleeve 60 which is disposed between the bracket arm 20 and the housing 30 and a similar sleeve 61, which is disposed between the bracket arm 20 and the eye at the end of the cross frame member. These are shown more particularly in Figs. 6 and 8, and in the preferred arrangement comprise a tapered helically wound flat metallic strip, the lower end of which fits snugly against the king pin. The upper end of the sleeve 60 extends into a cup-like recess 62, which is formed in the yoke, as is illustrated in Fig. 6, while the upper end of the sleeve 61 fits into a similarly shaped recess 63 formed on the under side of the arm 20. The sleeves, as formed, are capable of being automatically telescoped to allow full range of movement of the king pin in a predetermined substantially vertical direction, and as the normal tendency of them is to expand, they automatically extend themselves in conformity with the movement of the wheel with reference to the cross-frame.

As will be observed from an inspection of the drawings, the pneumatic elements are supported outside the frame sills 11, and hence, the distance between the points of yieldable suspension at the front of the vehicle is at least equal to or greater than that between the usual points of suspension at the rear of the vehicle. In this way, the body roll is reduced to a minimum and the riding qualities and safety of the car are materially increased.

I claim:—

1. A front wheel suspension for a motor vehicle comprising in combination, a body supporting member and a wheel supporting member, a king pin carried by one of the members and a guide for the king pin carried by the other member, the guide operating to permit movement of the king pin in a rectilinear direction within the guide and also to permit turning of the pin with reference to the guide, the wheel supporting member including an arm that extends inwardly of the wheel, said guide having an arm extending inwardly with reference to the wheel, a yieldable load suspension device disposed on one side of the king pin and bearing against the arms, and means for interconnecting the arms at one side of the device.

2. A front wheel suspension for a motor vehicle comprising in combination, a body supporting member and a wheel supporting member, a pin and a guide connection between the members, arms associated with the pin and guide, respectively, a yieldable load suspension device engaging the arms, and a link interconnecting the arms at one side of the suspension device.

3. A front wheel suspension for a motor vehicle comprising in combination, a frame supporting member and a wheel supporting member, a pin and a guide connecting the two members, a pair of arms extending inwardly from the pin and guide respectively, a yieldable load suspension device carried by the arms at one side of the pin and means connecting the arms at the inner ends thereof, said means including mechanism for progressively resisting the recoil movement of the suspension device.

4. A front wheel suspension for a motor vehicle comprising in combination, a frame supporting member and a wheel supporting member, a pin and a guide connecting the two members, a pair of arms extending inwardly from the pin and guide respectively, a yieldable load suspension device carried by the arms at one side of the pin, and means connecting the arms at the inner ends thereof, said means including a cam on one of the arms and a roller on the link for progressively resisting the recoil movement of the suspension device.

5. A front wheel suspension for a motor vehicle comprising in combination, a frame supporting member and a wheel supporting member, a pin and a guide connection therebetween, an arm extending inwardly from the pin and rigid therewith, a second arm swivelly connected to the guide at the upper end thereof and extending toward the frame, the inner end of the upper arm terminating in a cam, a link pivotally mounted to the lower arm adjacent the inner end thereof and having a roller engaging the cam, a seat carried by each of the arms at points intermediate the link and guide, and a yieldable pneumatic element mounted in each of said seats.

6. In combination, a vehicle frame terminating in a fork, the arms of which have aligned openings extending therethrough, a wheel, a support therefor, a yieldable suspension device carried by the support, the support having an apertured portion that is disposed between the arms of the fork, a king pin extending through the openings in the support and fork respectively, the yieldable suspension device being disposed in its entirety at one side of the king pin, said support including a lever, and means associated therewith for yieldably resisting the recoil movement of the suspension device.

ALBERT E. FORSYTH.